United States Patent
Abianeh et al.

(10) Patent No.: US 12,218,506 B2
(45) Date of Patent: Feb. 4, 2025

(54) SYSTEMS AND METHODS FOR SLIDING MODE CONTROL ENABLED HYBRID ENERGY STORAGE

(71) Applicant: University of Louisiana at Lafayette, Lafayette, LA (US)

(72) Inventors: Ali Jafarian Abianeh, Lafayette, LA (US); Farzad Ferdowsi, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 17/881,912

(22) Filed: Aug. 5, 2022

(65) Prior Publication Data
US 2023/0047077 A1 Feb. 16, 2023

Related U.S. Application Data

(60) Provisional application No. 63/229,704, filed on Aug. 5, 2021.

(51) Int. Cl.
| | |
|---|---|
| *H02J 3/38* | (2006.01) |
| *H02J 3/00* | (2006.01) |
| *H02J 7/00* | (2006.01) |
| *H02J 7/34* | (2006.01) |
| *H02J 7/35* | (2006.01) |

(52) U.S. Cl.
CPC ............. *H02J 3/381* (2013.01); *H02J 3/007* (2020.01); *H02J 3/388* (2020.01); *H02J 7/0063* (2013.01); *H02J 7/00711* (2020.01); *H02J 7/00712* (2020.01); *H02J 7/345* (2013.01);

(Continued)

(58) Field of Classification Search
CPC .. H02J 3/381; H02J 3/007; H02J 3/388; H02J 7/0063; H02J 7/00711; H02J 7/00712; H02J 7/345; H02J 7/35; H02J 2207/50; H02J 2300/26
See application file for complete search history.

(56) References Cited

PUBLICATIONS

Wikipedia contributors. "Rate limiting." Wikipedia, The Free Encyclopedia. Wikipedia, The Free Encyclopedia, Dec. 1, 2022. Web. Feb. 7, 2024. (Year: 2024).*

(Continued)

*Primary Examiner* — Daniel Cavallari
(74) *Attorney, Agent, or Firm* — Kean Miller LLP; Jessica C. Engler; Russel O. Primeaux

(57) ABSTRACT

Disclosed herein are systems and methods for sliding mode control enabled hybrid energy storage. In a specific embodiment, the system can include: a photovoltaic power generation unit; a hybrid energy storage system, where the hybrid storage system can include a battery, a supercapacitor, where the supercapacitor provides excess power demand based on different loading conditions, and a rate limiter; a sliding mode controller, where the slide mode controller controls a current in a hybrid energy storage system; a supercapacitor charging control; and a proportional integral controller. In a specific embodiment, the method can include: decoupling an average and transient hybrid energy storage system current with a single rate limiter, where the decoupling includes a battery discharge rate; regulating a battery current with a first sliding mode controller; and regulating a supercapacitor current with a second sliding mode controller, where a supercapacitor provides excess power demand.

4 Claims, 11 Drawing Sheets

(52) U.S. Cl.
CPC ............. *H02J 7/35* (2013.01); *H02J 2207/50* (2020.01); *H02J 2300/26* (2020.01)

(56) References Cited

PUBLICATIONS

S. K. Kollimalla, M. K. Mishra, A. Ukil and H. B. Gooi, "DC Grid Voltage Regulation Using New HESS Control Strategy," in IEEE Transactions on Sustainable Energy, vol. 8, No. 2, pp. 772-781, Apr. 2017, doi: 10.1109/TSTE.2016.2619759. (Year: 2017).*
Ranjan, Heuristics EMS for HESS of Electric Vehicle to Extended Battery Operation Using Rate Limiter; Advances in Electrical and Computer Engineering, vol. 1 Nov. 4, 2022.

* cited by examiner

PRIOR ART

SYSTEMS AND METHODS FOR SLIDING MODE CONTROL ENABLED HYBRID ENERGY STORAGE

CROSS REFERENCE TO RELATED APPLICATIONS

This application claims benefit of priority under 35 U.S.C. § 119 (e) of U.S. Ser. No. 63/229,704, filed Aug. 5, 2021, the entire contents of which is incorporated herein by reference in its entirety.

STATEMENT REGARDING FEDERALLY SPONSORED RESEARCH OR DEVELOPMENT

This invention was supported in part by the National Aeronautics and Space Administration (NASA) LaSPACE program, under grant number: 340200-243911-11.

BACKGROUND

Field

Disclosed herein are systems and methods for sliding mode control enabled hybrid energy storage. More particularly, the systems and methods can be used for controlling an islanded direct current microgrid.

Description of the Related Art

The increasing integration of power electronics dominant generation units into the electricity grid has imposed serious power quality challenges. The problem is approached from different aspects where less distorted power generation by means of multilevel power converters at the source side and power conditioning units at the load side have been broadly employed. As distributed generation (DG), and more specifically, microgrids, are becoming more popular, the role of energy storage systems (ESS) for addressing associated challenges becomes more vital. In microgrids, ESSs are deployed mainly for three main purposes: 1) as a backup source of power to seamlessly supply loads when an outage occurs, 2) to create capacity benefits by storing energy at off-peak times and powering the loads during the peak times, and 3) to enhance the power quality by smoothing the fluctuations and uncertainties coming from distributed energy resources (DER) such as solar photovoltaic (PV) cells. Among different types of ESSs, electro-chemical battery energy storage systems (BESS) provide a good trade-off between power and energy ratings. However, recent efforts regarding power grid modernization and emergent technologies for electric vehicles (EV) have brought concerns for batteries, mainly in terms of cost, battery health, and lifetime.

Consequently, there is a need for new systems and methods for controlling hybrid energy storage systems (HESS) within an islanded DC microgrid with pulsing power loads.

SUMMARY

Provided herein are systems and methods for sliding mode control (SMC) enabled hybrid energy storage. In a specific embodiment, the system can include: a photovoltaic power generation unit; a hybrid energy storage system, where the hybrid storage system can include a battery, a supercapacitor, where the supercapacitor provides excess power demand based on different loading conditions, and a rate limiter; a sliding mode controller, where the slide mode controller controls a current in a hybrid energy storage system; a supercapacitor charging control; and a proportional integral controller.

In a specific embodiment, the method can include: decoupling an average and transient hybrid energy storage system current with a single rate limiter, where the decoupling includes a battery discharge rate; regulating a battery current with a first sliding mode controller; and regulating a supercapacitor current with a second sliding mode controller, where a supercapacitor provides excess power demand based on different loading conditions.

In another specific embodiment, the method can further include: controlling a supercapacitor, where the supercapacitor is in parallel electronic communication with a direct current bus voltage control loop; detecting a supercapacitor voltage drop to a value lower than a minimum threshold supercapacitor voltage; providing a supercapacitor current setpoint, where the supercapacitor current setpoint is determined by offsetting a max setpoint current value from both an actual current value of the supercapacitor and a setpoint current value a battery; and saturating a capacity of a reference hybrid energy storage system current, where the battery current reference always remains saturated during the charging process, and where the supercapacitor is charged with the excess power generated by the battery compared with a demanded load power.

BRIEF DESCRIPTION OF THE DRAWINGS

The present disclosure can be better understood by referring to the following drawings. The drawings constitute a part of this specification and include exemplary embodiments of the systems and methods for sliding mode control enabled hybrid energy storage, which can be embodied in various forms.

DETAILED DESCRIPTION

Figure 1:
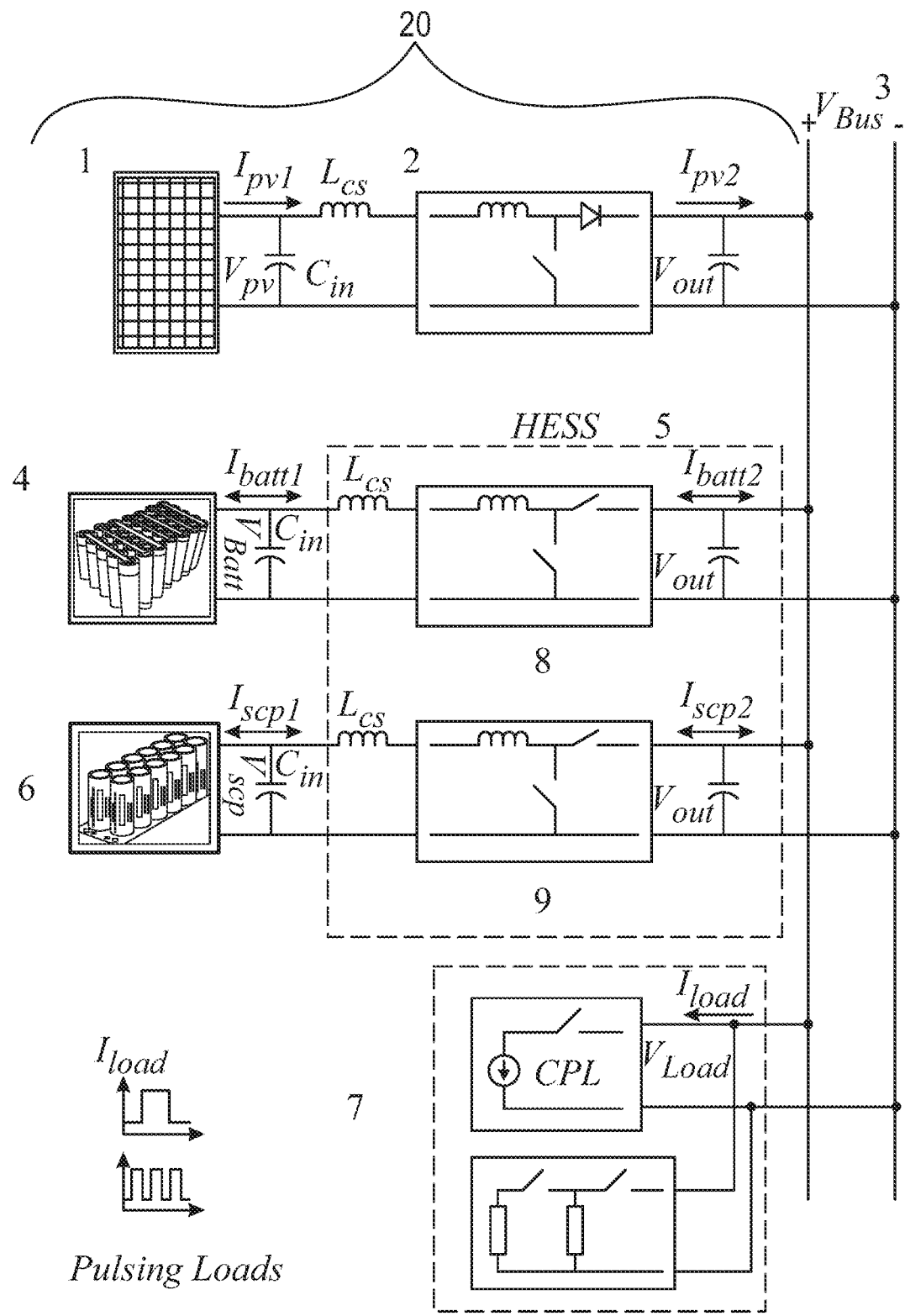
FIG. 1 depicts an electrical block diagram of the islanded direct current (DC) microgrid with photovoltaic (PV) and hybrid energy storage system (HESS) units.

The systems and methods for sliding mode control (SMC) enabled hybrid energy storage can include, but are not limited to: one or more photovoltaic power generation units; one or more hybrid energy storage systems; one or more sliding mode controllers; one or more supercapacitor charging controls; one or more proportional integral (PI) controllers; and one or more a pulse-width modulation controllers. The one or more hybrid storage systems can include, but are not limited to: one or more batteries; one or more supercapacitors; and one or more rate limiters.

The systems and methods can allow for control of hybrid energy storage systems within an islanded DC microgrid with pulsing power loads. While the photovoltaic power generation unit operates as the main power source, a combination of battery and supercapacitor is incorporated to efficiently fulfill the excess power demand based on different loading conditions. To ensure the proper battery discharge rate, the conventional low pass filtering approach for decoupling the average and transient HESS current components is replaced with a single rate limiter.

By the elimination of the low pass filter (LPF), the challenges for non-systematic selection of cut-off frequency are rectified as more tangible factors, such as battery discharge rate, can be incorporated for decoupling purposes. In addition, the associated undesirable phase lag and enhanced nonlinear effect on the current responses caused by low-order LPFs are avoided. A sliding mode control is employed for the battery current regulation to provide proper tracking of the rate-limited current setpoints and avoid common windup issues associated with proportional integral controllers in the presence of system nonlinearities and uncertainties.

To address the sluggish response of linear controllers to the fast transients frequently observed on supercapacitor current setpoints, the same sliding surface structure with modified tuning is utilized. For the supercapacitor cyclic charging instances, an on-the-fly charging approach is used. Unlike conventional approaches, the on-the-fly charging ensures uninterruptible charging in the presence of frequent load transients such as pulsing power loads.

In simple terms, a battery's durability is a function of a battery's depth of discharge (DoD) and its rate of charge/discharge. While a proper DoD can be met with smart integration of state of charge (SoC) control into the power management schemes, the discharge rate control demands that storage units with higher transient response capabilities and tolerance levels be integrated with batteries to form a hybrid energy storage system. In this regard, high power density supercapacitors can fulfill the transient power supply requirements, as characterized with low series resistance values, and ensuring secure battery discharge rates.

To clearly demonstrate differences between these two storage units, a general comparison between them is given in Table 1 in terms of the expected life, power and energy ratings, and cost per kW and kWh, as reported by US Department of Energy. K. Mongird et al, Energy Storage Technology and Cost Characterization Report, Technical Report, Pacific Northwest National Lab, Richland, WA, 2019.

TABLE 1

Performance & cost comparison between Li-ion battery and supercapacitor

| | Expected life* | | Power | Energy | Power Cost ($/kW) | | Energy Cost ($/kWh) | |
|---|---|---|---|---|---|---|---|---|
| | Cycles | Years | Rating | Rating | Year 2018 | Year 2025 | Year 2018 | Year 2025 |
| Li-ion battery | 3,500 | 10 | 1 kW-100 MW | <200 MWh | 1876 | 1446 | 469 | 362 |
| Supercapacitor | 1,000,000 | 16 | 250 kW-2 MW | 2.5 kWh-20 kWh | 930 | 835 | 74480 | 66640 |

*Average at 80% DoD

The high number of cycles as well as the lower cost per kilowatt (kW) for supercapacitors have greatly encouraged the integration of supercapacitors with batteries in HESS. Using hybrid solutions, such as the systems and methods for sliding mode control enabled hybrid energy storage, the power rating for batteries can also be lowered to the optimal level as they are only in charge of supplying average power, and transient conditions are handled by supercapacitors.

HESS have been integrated into different configurations of microgrids. The conventional systems include semi-active HESS topologies, with both passive and active couplings of storage units to the common DC bus. In these systems, the battery is connected to the DC bus by means of a bidirectional converter, and a passive supercapacitor connection is utilized for surpassing the impact of pulsing loads. The direct connection of the battery and interfaced integration of supercapacitor to the DC bus are used for power-sharing with the droop concept being employed. Despite the overall loss reduction attained by eliminating the additional power converters on such microgrid topologies, the lack of control on the passively-connected storage unit hinders the effective use of its full range capacity, and the dynamic current-sharing between the storage units is relatively poor.

To enhance the current-sharing performance and enable proper utilization of the maximum capacity on the storage units, various types of fully active HESS have been investigated. In some conventional systems, a combination of fuel cell and supercapacitors are employed for the current sharing scheme. The fuel cell is utilized for transient currents and the supercapacitor is used for supplying the average and oscillatory currents. In some systems, a hybrid solution is formed on the basis of a battery-supercapacitor combination where the battery supplies the average current component and the supercapacitor provides the transient responses. In yet other systems, a multilevel control and optimization algorithm is applied to the full-active HESS where the same current sharing concept is used. While maintaining the same current components decoupling strategy, a more detailed power management algorithm is used in some prior systems.

In all these prior systems, a low-order LPF is employed to decouple between the high frequency and low frequency current components with respect to the HESS current setpoint. However, the lack of a systematic approach for selection of the cut-off frequency makes its design process quite challenging. In fact, the system's performance is highly dependent on the chosen cut-off frequency, which instead of being formed on the basis of tangible criteria such as battery charge/discharge rate control and optimal peak power reduction, is only decided based on the frequency of power demand.

Also, due to the inherent lagging nature of LPFs, their combination with linear PI controllers results in poor current regulation on such highly nonlinear systems in the case of full-active HESS. Some prior schemes have integrated an additional compensatory term as the feedforward to lessen the impact of regulation errors caused by linear controllers, but this approach does not provide proper compensation under different operating conditions. Moreover, the presence of the tightly regulated power loads, such as constant power loads (CPLs), in direct connection with two power converter interfaced storage units makes the system vulnerable to instability.

To overcome these shortcomings, applied advanced control algorithms to the HESS integrated power generation systems have been tried. In some these systems, model predictive control (MPC) is employed to regulate the HESS current and voltage values. In this scheme, the decoupling between the current components is attained by means of modified cost function and the algorithm is formed on the three-time-constant model for super-capacitor and mean-average converter models. In other systems, an enhanced MPC algorithm was used where the cost function was modified to lower the supercapacitor voltage fluctuations, utilizing a more accurate battery model. However, in such MPC algorithms, proper decoupling between current components is not sufficiently achieved as the cost function weights are not well optimized under different operating conditions. Moreover, the system performance is dependent on the underlying model accuracy, which is compromised by lower order models and system parameter uncertainties. To address the modeling uncertainties, some algorithms based on adaptive MPC for shipboard microgrid, self-compensated MPC, and MPC with online parameter identification for HESS in electric vehicle systems have been proposed. However, all these schemes are either ineffective in rectifying the introduced error terms or encounter excessive complexity, which makes them unfeasible. The systems and methods for sliding mode control enabled hybrid energy storage can mitigate the challenges associated with these modeling inaccuracies.

Another critical challenge to hybrid energy storage systems is the implementation of an effective supercapacitor charging algorithm to ensure proper utilization of its available capacity. In some systems, supercapacitor charging through the battery is used, however, it only charges from an external power source or during load energy recovery in electric vehicles and the algorithms can be prone to supercapacitor deep discharge and battery lifespan reduction, especially when a reliable external power generation source is not always available. Some schemes integrate a voltage control loop to ensure that supercapacitor voltage is always regulated to its nominal value. However, this approach can inversely impact the supercapacitor load regulation performance as it generally contradicts the voltage regulation. To mitigate this problem, interruptible super-capacitor charging algorithms have been tried that use the hysteresis concept and a PI controller. However, in these schemes the charging process is always interrupted once a load transient is detected and remains inactive for a specified interval. This phenomenon can result in supercapacitor deep discharge if a frequent pulsing power load is connected to the system.

The systems and methods for sliding mode control enabled hybrid energy storage can include two first-order sliding mode control that can perform independent regulation of both dynamic and average current components within the HESS control structure. Unlike previous sliding mode control approaches, the systems and methods for sliding mode control enabled hybrid energy storage can provide consistent regulation over the supercapacitor transient current component, which in the prior art was either omitted or deactivated during the charging process. Also, the destabilizing transition process between the current and voltage control objectives are avoided.

The systems and methods for sliding mode control enabled hybrid energy storage can include a model-independent nature of the algorithm to facilitate its practical implementation in terms of the complexity level as compared to model-dependent SMCs. The systems and methods for sliding mode control enabled hybrid energy storage can include using a discontinuous switching function, allowing for fast dynamic response for the supercapacitor and proper setpoint tracking on the slow dynamic battery current. The systems and methods for sliding mode control enabled hybrid energy storage can include a rate limiter to properly decouple the current components with a more tangible term, which directly represents the permissible battery charge/discharge rates and avoids the lagging phenomenon on LPFs.

The systems and methods for sliding mode control enabled hybrid energy storage can include a linear adaptation utilized within the surface boundary layer to resolve the chattering effect associated with the switching function. To address the challenge of supercapacitor charging interruption under load transients, the systems and methods for sliding mode control enabled hybrid energy storage can include an on-the-fly supercapacitor charging algorithm. The systems and methods for sliding mode control can enable hybrid energy storage, prioritizing the DC bus voltage regulation over its charging scheme with an adaptive current limiting unit, such as filters or rate limiters, to ensure the shortest possible on-the-fly charging process under different loading conditions, including pulsing power loads.

Conventional Hess Scheme with LPF Decoupling

Figure 2:
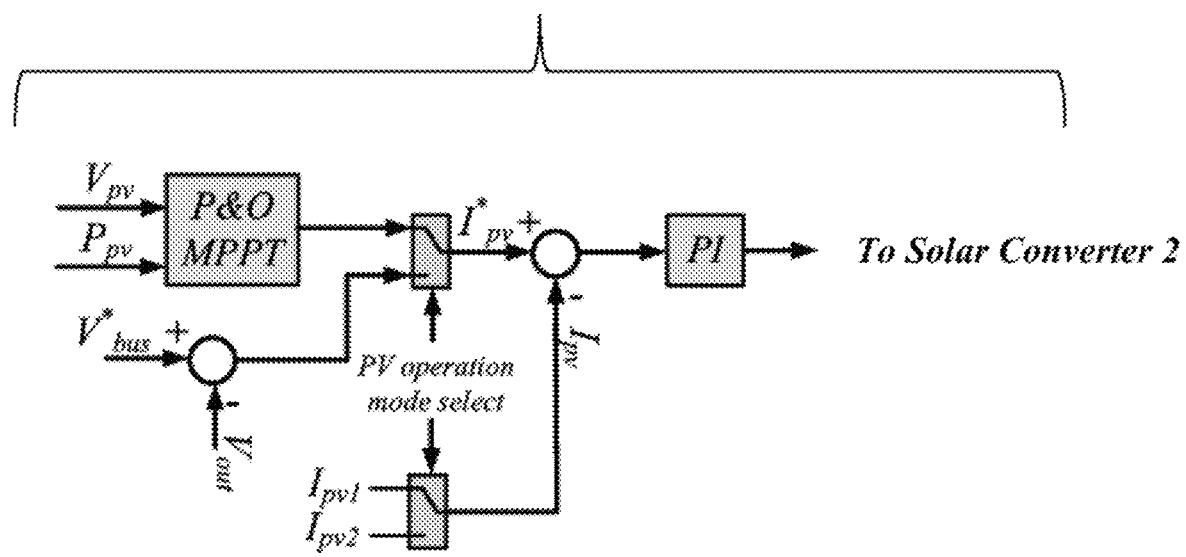
FIG. 2 depicts a block diagram of the PV solar control unit.

As shown in FIG. 1, an embodiment of the islanded DC microgrid comprises a solar unit 1 (also referred to as the PV unit), which in one embodiment comprises a plurality of PV cells, a solar converter 2, a DC voltage bus 3, at least one battery pack 4, a hybrid energy storage system (HESS) unit 5, a supercapacitor module 6, and two or more loads 7. The HESS comprises a battery converter 8 and a supercapacitor converter 9. The solar converter 2, battery converter 8, and supercapacitor converter preferably each comprise a pulse width modulator (PWM). In the embodiment shown in FIG. 1, the islanded DC microgrid, consisting of PV solar unit 1 as the main source of power and a full-active HESS unit 5. This microgrid is configured in the islanded operation mode where the power generation level is dictated by the load power demand and the requirements for charging the connected storage units. In islanded operation mode, the PV unit 1 is operated in the voltage control mode if the demanded power level $P_{load}$ is less than its available instantaneous maximum power point. This enables DC bus voltage regulation by the PV solar converter 2 while the current level is regulated to supply the loading profiles. The solar unit 1 comprises a control system as shown in FIG. 2. Due to the power generation limitations on the PV solar unit 1, the solar converter is switched to the maximum power point tracking (MPPT) mode, a method known to those having skill in the art for maximizing energy extraction from power generation system once the demanded load power exceeds the PV unit 1 power level. In this mode, the reference current is extracted by means of MPPT algorithms known to those having skill in the art, such as perturb & observe (P&O) and incremental conductance. These step-wise algorithms 10 calculate the reference panel current ($I^*_{pvl}$) to be fed as the setpoint to the current regulator.

While the power generated by PV unit 1 fulfills the load power demand, the HESS unit 5 does not contribute to supplying the load and only remains in the voltage control mode (either works in the standby mode or supplies its locally connected critical loads). Once the excess power level is demanded by the loads 7, the HESS is enabled only if the battery state of charge_is higher than its lower permissible threshold. This limit is basically set to avoid excessive depth of discharge and contributes to enhancing the battery durability.

Figure 3:
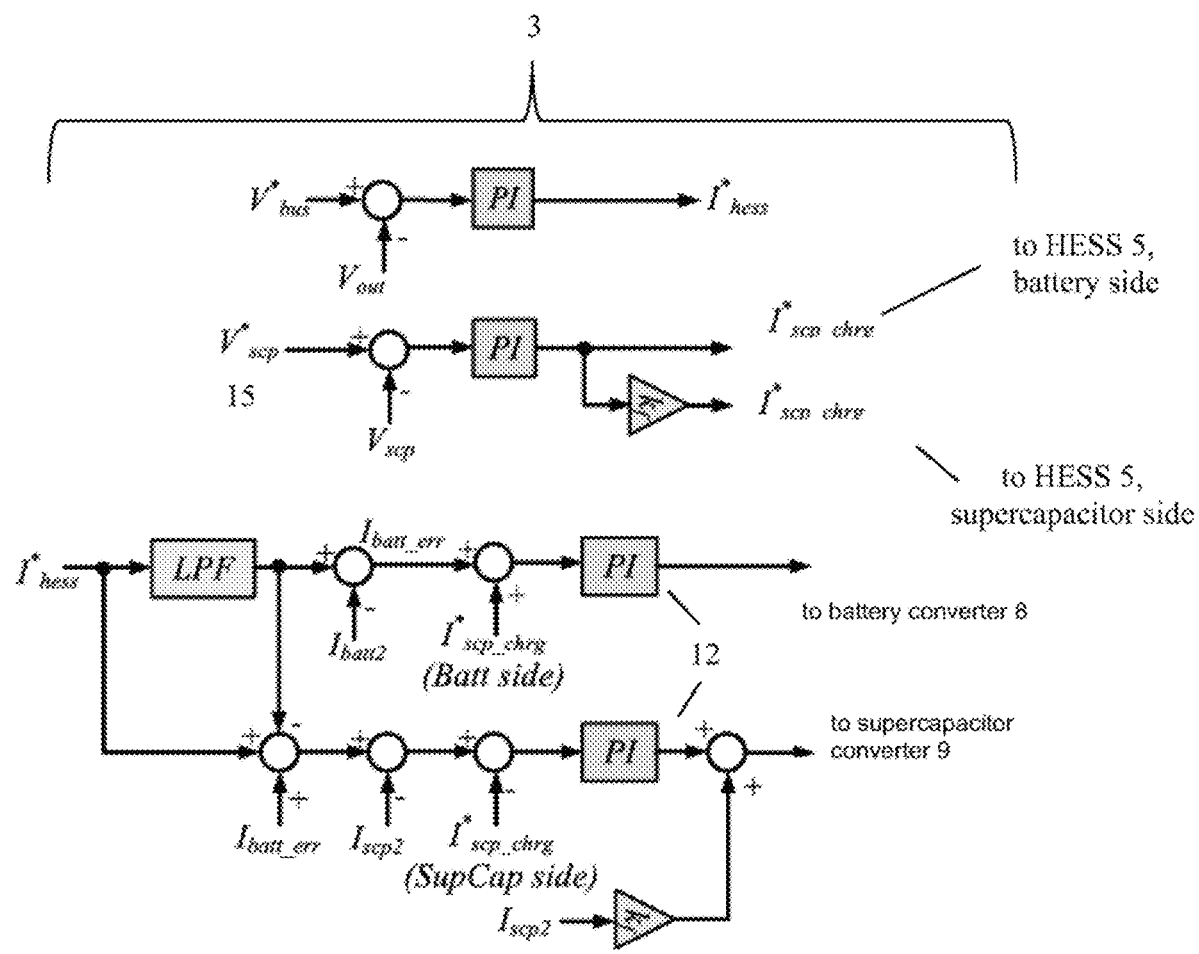
FIG. 3 depicts conventional HESS internal current sharing and cyclic supercapacitor voltage charging.

For a conventional HESS, the reference current values are generated via linear regulation of DC bus voltage. The conventional HESS further comprises a current regulation and supercapacitor cyclic voltage charging control scheme as shown in FIG. 3. A common approach to decouple the steady-state and dynamic HESS current components uses a low-order low pass filter (LPF) 11 to avoid the unfeasible complexity of high-order filters for implementation. Without a systematic approach, several different cut-off frequencies are chosen by LPF decoupled schemes, where 5 Hz, as the most common selected value. The low-pass filter 11 component is assigned to the battery for regulation, which can be also referred to as the average current component of the HESS. The LPF block is incorporated, as shown in FIG. 3, to avoid excessively high battery discharge rates, while the transient current is provided by the supercapacitor.

Using the linear proportional integration (PI) controllers 12 to regulate both transient and average current components result in sluggish tracking and windup issues. In some prior systems, the battery current error is fed to a supercapacitor to compensate and a feedforward term is used to improve the transient response. However, such modified linear control schemes, are not able to address the nonlinear nature of the converters. Moreover, the presence of low-order LPFs can further deteriorate the performance as it increases system nonlinearity, which does not necessarily follow the proper battery discharge rate.

To enable supercapacitor module 6 charging even when the HESS unit 5 is contributing to demanded load power (discharge mode), it is common in the art to include a charging mode where the battery supplies the power to regulate the supercapacitor voltage with its nominal value. An additional voltage controller is commonly employed where the resultant current reference output is used for modification of the HESS controller setpoints. A problem in the conventional schemes is that they fully interrupt the supercapacitor voltage charging once a minor non-zero supercapacitor current value is detected to ensure proper DC bus voltage regulation. This approach can be inefficient if there are frequent pulsing power loads in the microgrid system.

The SMC HESS Scheme and On-the-fly Supercapacitor Charging

Figure 4:
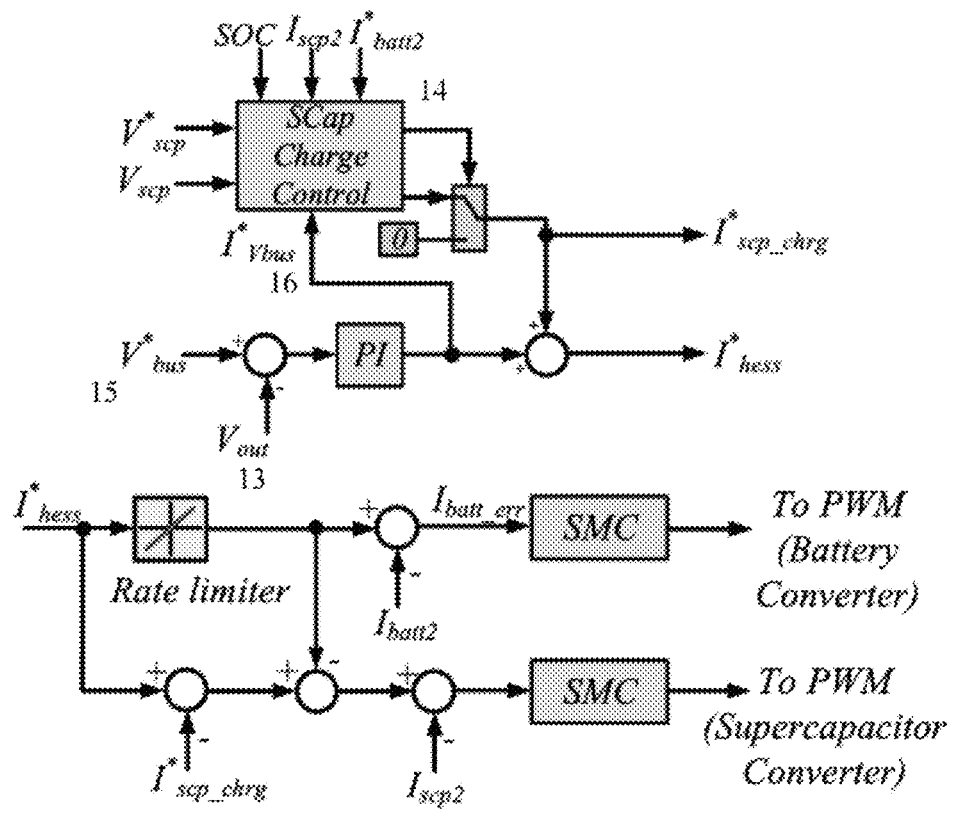
FIG. 4 depicts a sliding mode control of the HESS internal current sharing and uninterruptible super-capacitor voltage charging.

The systems and methods for sliding mode control enabled hybrid energy storage to address the shortcomings of the conventional HESS current sharing schemes is shown in FIG. 4 (hereinafter referred to as the "Disclosed System and Method"). The Disclosed System and Method-replaces the low pass filter of conventional HESS schemes with a current rate limiter 13. The Disclosed System and Method can include a single slope fixed limiter instead of an adaptive dual-slope limiter. The single slope fixed limiter can meet the requirements for battery discharge rates and avoids additional unnecessary complexity. The Disclosed System and Method can further include a restricted current setpoint assigned to the battery while the remaining current transients can be handled by the supercapacitor.

Unlike other advanced control schemes, sliding mode control (SMC) does not require the exact model of the system, and its discontinuous control nature enables a highly robust performance even under parameter uncertainties and bounded perturbations. Furthermore, SMC schemes are capable of superior dynamic response and flawless tracking of low-frequency setpoints even under the presence of disturbances. To ensure that the control objectives are met, selecting the proper sliding surfaces is important. For regulation of battery and supercapacitor current components, the systems and methods for sliding mode control enabled hybrid energy storage can include two independent first-order sliding surfaces are chosen as represented by equations (1)-(4) shown below, $$\begin{cases} e_{ibt} = I^*_{batt2} - I_{batt2} \\ e_{isc} = I^*_{scp2} - I_{scp2} \end{cases} \quad (1)$$

$$S = [S_{ibt}, S_{isc}] \quad (2)$$

$$S_{ibt} = e_{ibt} + c_{ibt} \int e_{ibt} dt \quad (3)$$

$$S_{isc} = e_{isc} + c_{isc} \int e_{isc} dt \quad (4)$$

where $e_{ibt}$ and $e_{isc}$ denote the output current error terms for the battery and supercapacitor converters, respectively. $I^*_{batt2}$ and $I^*_{sep2}$ are the setpoint current values, $I_{batt2}$ and $I_{scp2}$ are the actual current values for battery and supercapacitor, respectively. $S_{ibt}$ and $S_{isc}$ are the chosen sliding surfaces and $c_{ibt}$ and $c_{isc}$ are constant control gains for battery and supercapacitor, respectively.

Conditions are identified to ensure convergence of the state variables toward the specified sliding manifolds and provide a desirable steady-state performance by retaining them over the surfaces. The regulation objectives can be met when $S_{ibt}=S_{isc}=0$. By applying this to equations (3) and (4) above, the following equations can be derived:

$$e_{ibt} + c_{ibt} \int e_{ibt} dt = 0 \quad (5)$$

$$c_{isc} + c_{isc} \int e_{isc} dt = 0 \quad (6)$$

Taking derivatives of (5) and (6) and rearranging them results in:

$$\frac{d}{dt}e_{ibt} = -c_{ibt}e_{ibt} \quad (7)$$

$$\frac{d}{dt}e_{isc} = -c_{isc}e_{isc} \quad (8)$$

From equations (7) and (8), it can be inferred that for any positive constant gain values ($c_{ibt}>0$ and $c_{isc}>0$), the convergence of the state variables to the desired manifolds is guaranteed. To enforce sliding mode operation over the manifolds, the discontinuous control function of sgn(.) can be used. To address the associated chattering effect, the sgn(.) function is replaced with a continuous function within the boundary layer of the sliding surface as represented by equation (9) and the resultant control action is given by equation (10):

$$\text{sgn}_{cont}(S_k) = \begin{cases} 1, & \text{if } S_k > \varepsilon_k \\ \frac{S_k}{\varepsilon_k}, & \text{if } |S_k| < \varepsilon_k \\ -1, & \text{if } S_k < -\varepsilon_k \end{cases} \quad (9)$$

$$SMC_{out} = K_{smc} \cdot \text{sgn}_{cont}(S_k) \quad (10)$$

where $S_k$ denotes any of the $S_{ibt}$ and $S_{isc}$ sliding surfaces and $\varepsilon_k>0$ is the boundary layer threshold that also acts as the smoothing factor on the transition between two schemes. $K_{smc}$ is the sliding control gain and $SM_{Cont}$ indicates the SMC controller outputs.

The Disclosed System and Method can provide improved dynamic performance, while eliminating the feedforward term for the supercapacitor current regulator. Moreover, the battery current error term is not needed for compensation purposes, as the SMC battery current controller is capable of quick convergence to setpoints and smooth tracking of it throughout the profile. With less tuning efforts involved, a more systematic and facilitated setup process is attained.

Figure 5:
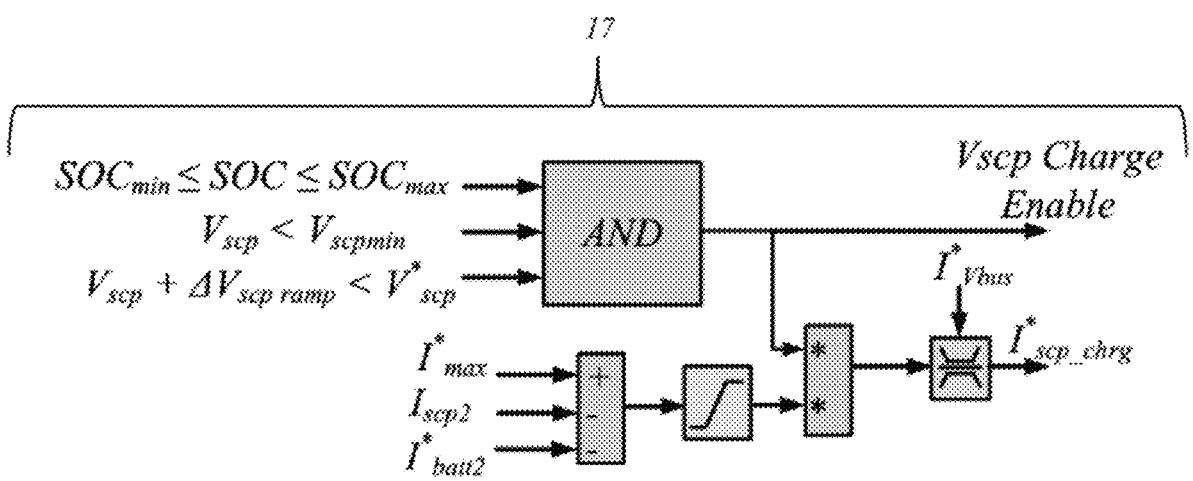
FIG. 5 depicts a method for the adaptive on-the-fly supercapacitor voltage charging.

As shown in FIG. 4, the Disclosed System and Method can include a supercapacitor voltage charging algorithm 17 that uses a supercapacitor charging control block 14 in parallel with the DC bus voltage control loop 15, which uses an offset term 16 to modify the supercapacitor current setpoint. A block diagram embodiment of the supercapacitor voltage charging algorithm is shown in FIG. 5. For activation of this block, several criteria must be met, which include having the battery state of charge (SOC) in the permissible range ($SOC_{min} \leq SOC \leq SOC_{max}$), and detecting supercapacitor voltage drop to a value lower than its minimum threshold ($V_{scp} < V_{scpmin}$). Once these conditions are met, the remaining capacity of the reference—HESS current (as limited by $I^*_{Vbus}$ to prioritize the DC bus voltage regulation) is saturated by incorporating the ($I^*_{max} - I_{scp2} - I^*_{batt}$) term, ensuring an increase with the limited slope without using an extra rate-limiter block. Using this term (as applied to both $I^*_{hess}$ and $I^*_{scp}$ simultaneously), the battery current reference can remain saturated during the charging process. Thus, the supercapacitor is charged with the excess power generated by the battery compared with the demanded load power.

Figure 6:
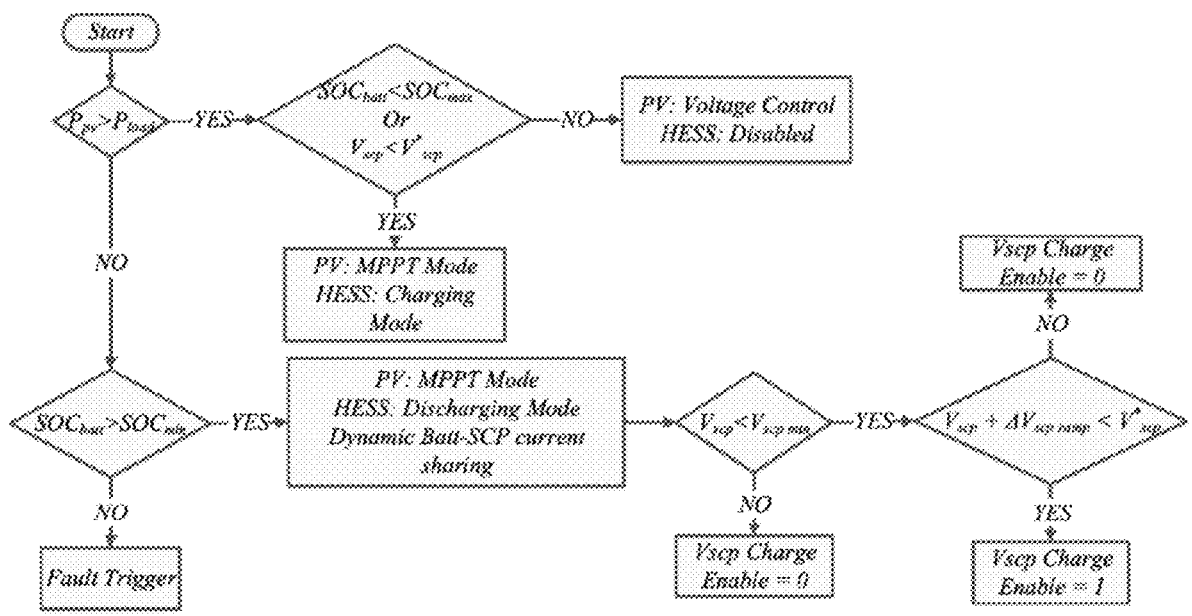
FIG. 6 is a flowchart for a method for sliding mode control enabled hybrid energy storage.

While this approach ensures that the supercapacitor is being charged within the shortest possible time duration, the algorithm is also capable of quick response to the load power changes without interrupting the charging process. This operation is attained by the deduction of the supercapacitor charging current based on the on-the-fly demanded load power. Because the rate-limited battery reference current component is closely tracked by SMC, the $I^*_{batt}$ is used instead of its actual value. Due to quick dynamic changes in supercapacitor currents, the actual value of ($I_{scp2}$) is used. To ensure that the proper charging level is reached on the supercapacitor, on each state, a predicted future voltage value ($V_{scp} + \Delta V_{scpramp}$) is continuously estimated and compared with the nominal supercapacitor voltage value ($V^*_{scp}$). Once this threshold is reached, the charging scheme becomes disabled. FIG. 6 is a flowchart for the power management method of DC microgrid consisting of the PV unit and the Disclosed System and Method. It shows how the PV unit switches between voltage control mode and MPPT mode and how the condition for supercapacitor charging mode activation within a HESS discharge state is changed.

The power management method as shown in FIG. 6 first begins by comparing the power demanded by the load $P_{load}$ to the power available from the PV unit $P_{pv}$. If $P_{load}$ is greater than the power available from the PV unit $P_{pv}$, the system will next compare the present state of chart of the battery $SOC_{batt}$ to the minimum battery state of charge $SOC_{min}$. If the $SOC_{min}$ is greater than $SOC_{batt}$, a fault is triggered. However, if the $SOC_{batt}$ is greater than the $SOC_{min}$, the PV unit 1 will enter MPPT mode and the HESS unit 5 will enter discharging mode, allowing dynamic battery and supercapacitor current sharing. If the supercapacitor's voltage $V_{scp}$ is less than the minimum required supercapacitor voltage $V_{scp\,min}$, the supercapacitor will not enable charging. However, if the $V_{scp}$ is greater than $V_{scp\,min}$, the supercapacitor voltage charging algorithm as shown in FIG. 5 will be enabled, allowing charging only if the predicted future voltage value ($V_{scp} + V_{scp}$ ramp) is less than the nominal supercapacitor voltage value ($V^*_{scp}$). Alternatively, at the outset, if the power demanded by the load $P_{load}$ is less than the power available from the PV unit $P_{pv}$, the system will then evaluate the current status of the battery and supercapacitor. If the $SOC_{batt}$ is less than the $SOC_{max}$ or the $V_{scp}$ is less than the Vascp, the PV unit 1 will enter MPPT mode and the HESS unit 5 will enter charging mode. If instead the $SOC_{max}$ is less than the $SOC_{batt}$ or the $V^*_{scp}$ is less than the $V_{scp}$, the PV unit 1 will enter voltage control mode and the HESS unit 5 is disabled.

EXAMPLES

To provide a better understanding of the foregoing discussion, the following non-limiting examples are offered. Although the examples can be directed to specific embodiments, they are not to be viewed as limiting the invention in any specific respect.

A comparative real-time simulation study was performed using a Typhoon HIL-402 to validate the performance of the systems and methods for sliding mode control enabled hybrid energy storage and its associated on-the-fly supercapacitor charging algorithm. Two different islanded DC microgrid configurations were considered. First, the configuration as previously shown in FIG. 1 with parameter settings of Table 2 was studied.

TABLE 2

System parameters - configuration 1

| Parameters | Value |
|---|---|
| Bus voltage (V) | 80 |
| Battery voltage (V) | 12 |
| Battery capacity (Ah) | 12 |
| Battery no. in series | 4 |
| Supercap. voltage (V) | 15 |
| Supercap. capacity (F) | 4 |
| Supercap. no. in series | 4 |
| Supercap. max contianous current | 20 |
| Converter parameters | $L_{in-pv}$ = 10 mH, $C_{out-pv}$ = 440 uF $L_{in-bt}$ = 1.63 mH, $C_{out-bt}$ = 440 uF $L_{in-sc}$ = 2 mH, $C_{out-sc}$ = 440 uF |
| Load parameters | R_load1 =16 Ω, R_load = Ω 8, P_CPL = 100-800 W |
| Conventional control parameters | $K_{p-vscp}$ = 10, $K_{i-vscp}$ = 25 $K_{p-ipv}$ = 0.1, $K_{i-ipv}$ = 30 $K_{pi-bt}$ = 0.05, $K_{ii-bt}$ = 20 $K_{pi-sc}$ = 0.1, $K_{ii-sc}$ = 30 |
| Proposed control parameters | $K_{smc-bt}$ = 0.4, $c_{ibt}$ = 80, $\varepsilon_{k-bt}$ = 0.1 $K_{smc-sc}$ = 0.6, $c_{isc}$ = 50, $\varepsilon_{k-sc}$ = 0.1 |
| Voltage Control | $K_{p-Vbus}$ = 5, $K_{i-Vbus}$ = 100 |

Figure 7:
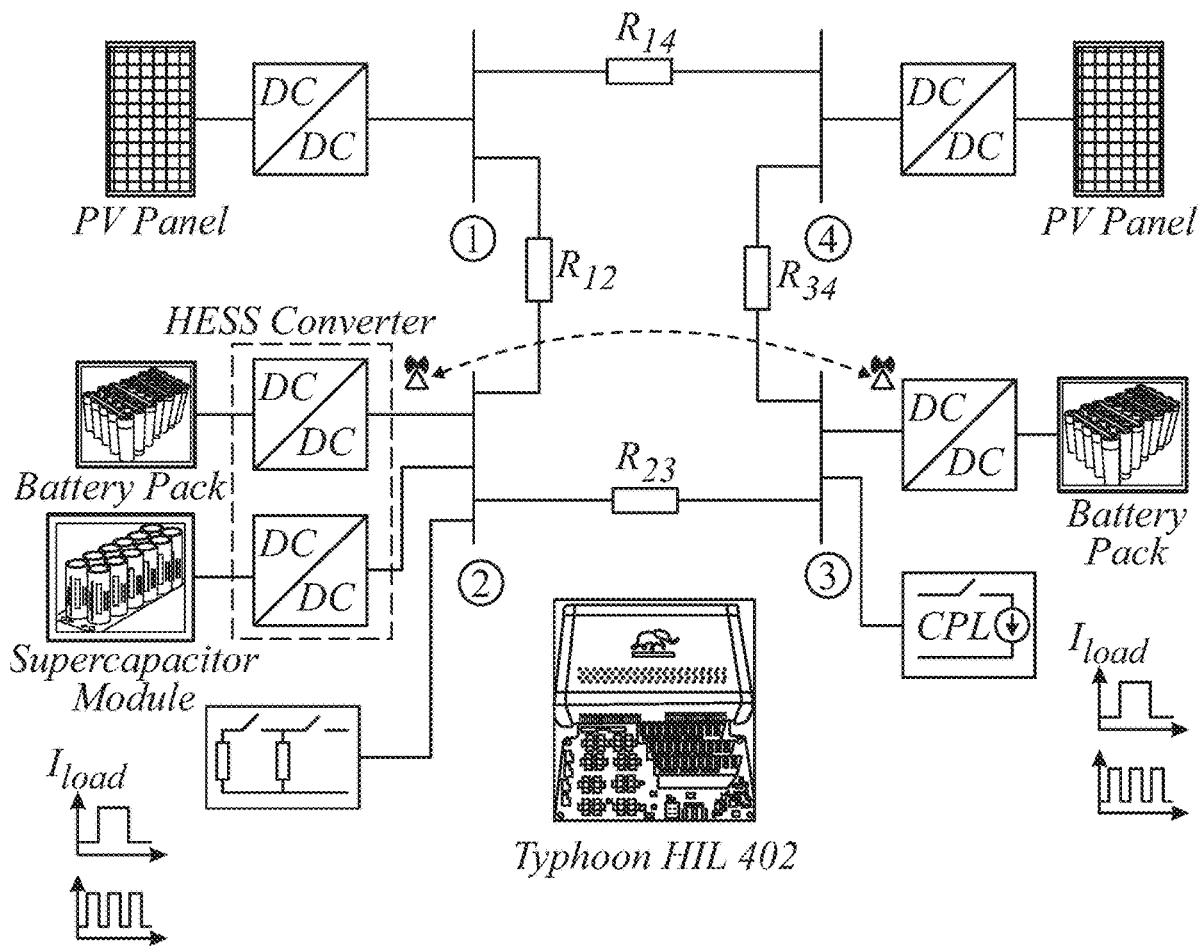
FIG. 7 depicts an islanded DC microgrid with HESS and distributed control with BESS.

For the second configuration, a 4-bus islanded DC microgrid, as shown in FIG. 7, was studied where its parameters are also stated in Table 3.

TABLE 3

System parameters - configuration 2

| Parameters | Value |
|---|---|
| Bus voltage (V) | 368 |
| Battery voltages (V) | 379 |
| Supercap. voltage (V) | 200 |
| Line impedance (Ω) | $R_{12}$ = 1.8, $R_{23}$ = 23 $R_{34}$ = 21, $R_{14}$ = 1.3 |
| Converter 1, 4 | $L_{in}$ = 3 mH, $C_{out}$ = 250 μF, $I_{max}$ = 17 A $L_{in}$ = 4.6 mH, $C_{out}$ = 250 μF, $I_{max}$ = 11.5 A |
| Converter 2, 3 | |
| Load parameters | $R_{load1}$ = 72 Ω, $R_{load2}$ = 24 Ω, $P_{CPL}$ = 1-4 kW |
| Conventional Control | $K_{p-vscp}$ = 10, $K_{i-vscp}$ = 25 $K_{p-ipv}$ = 0.1, $K_{i-ipv}$ = 20, $K_{p-ibt}$ = 0.02, $K_{i-ibt}$ = 15 $K_{p-isc}$ = 0.04, $K_{i-isc}$ = 20 |
| Proposed Control | $K_{smc-bt}$ = 0.45, $c_{i-bt}$ = 100, $\varepsilon_{k-bt}$ = 0.1 $K_{smc-sc}$ = 0.65 $c_{i-sc}$ = 70, $\varepsilon_{k-sc}$ = 0.1 |
| Voltage Control | $K_{p-Vbus}$ = 5, $K_{i-Vbus}$ = 50 |
| Secondary Control | $K_{p-sec}$ = 0.01, $K_{i-sec}$ = 10 |

In the first configuration, a solar unit is in connection with a HESS unit to supply the power demanded from the load block, which consists of both constant/pulsing CPL and resistive load. Using this configuration, three different test scenarios were investigated for discharge and on-the-fly charge modes. As shown in FIG. 7, the HESS unit along with BESS unit were placed at two neighboring nodes along with two solar units placed at the remaining nodes to demonstrate how the systems and methods for sliding mode control enabled hybrid energy storage with a local controller in the HESS unit operates in a 4-bus configuration under distributed pulsing load condition. To show the performance of the local controller, more specifically HESS current control and on-the-fly supercapacitor charging, only a single communication link between HESS and BESS units in the secondary control layer was considered for distributed current sharing. The local control for nodes 1, 3, 4 were maintained with the conventional PI, and only the resultant improvements between conventional and the novel HESS control scheme were investigated.

Scenario A: HESS Current Control Under Resistive Load Step

Figure 8:
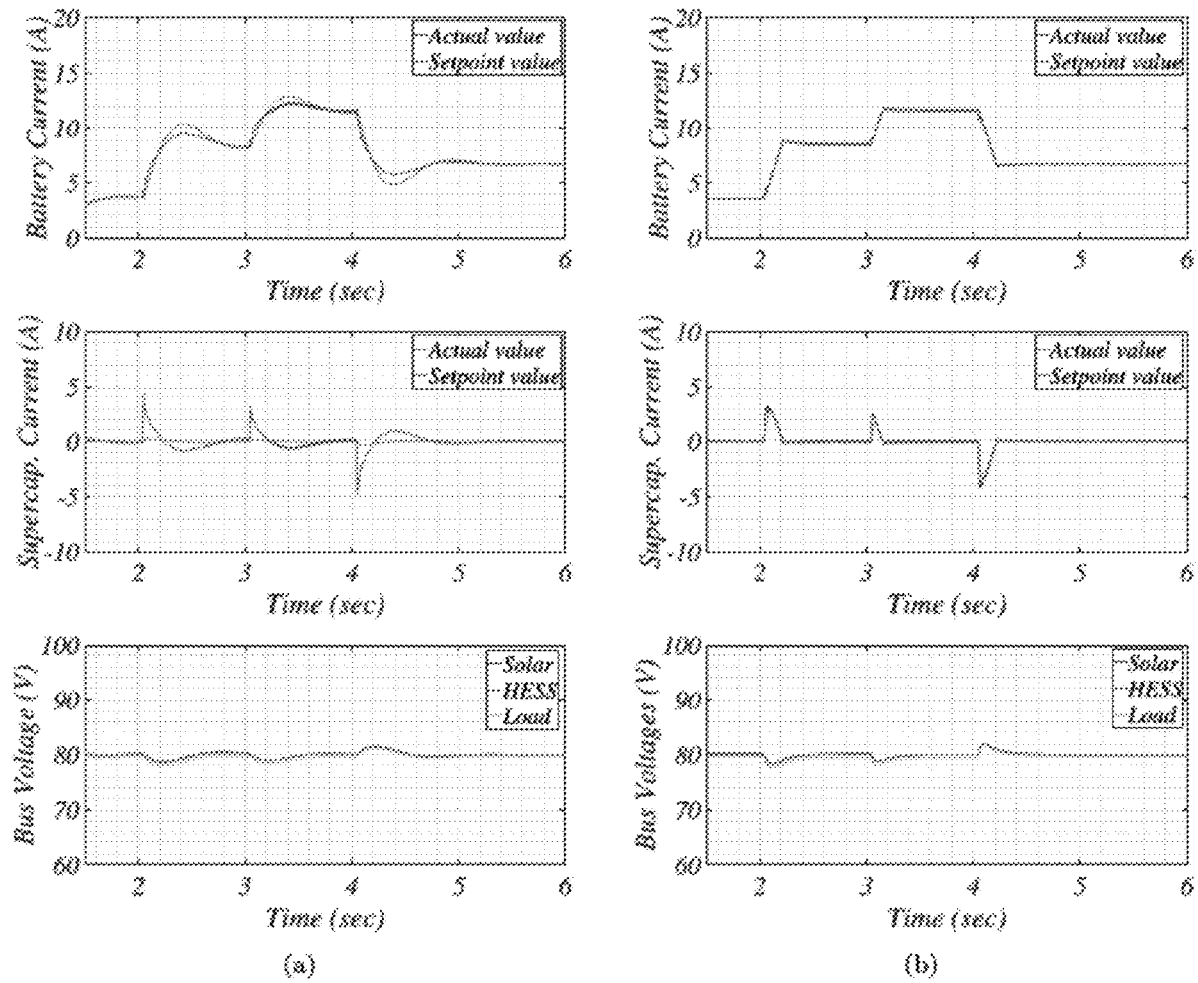
FIG. 8 are graphs of the current and voltage control for a HESS unit under resistive load steps and PV node disconnection for (a) conventional control and (b) embodiments of systems and methods for sliding mode control enabled hybrid energy storage in accordance with the present invention.

FIG. 7 shows the system tested under a resistive load change and the subsequent solar unit disconnection to demonstrate the improved dynamic and average current sharing performance between the battery and supercapacitor as well as the battery charge/discharge rate control on HESS unit. In this case, the CPL was set with constant power value of 100 W, which due to its tightly regulated nature adds to the system nonlinear behavior. FIG. 8 shows the battery currents, supercapacitor currents, and DC bus voltages for both conventional and the systems and methods for sliding mode control enabled hybrid energy storage. In this case, the initial load power ($R_{load1}$=16Ω) draws about 4 A from HESS unit and the remaining load power is supplied by the solar.

First, a load step-up to $R_{load2}$=8Ω is applied at about t=2 sec. In the systems and methods for sliding mode control enabled hybrid energy storage, the actual battery current value smoothly follows the setpoint with almost instant convergence within 0.02 sec and an error-free steady state current tracking is achieved and maintained under the following applied disturbances. For conventional schemes, the battery setpoint is not properly controlled because of the lagging phenomenon introduced by the LPF and the sluggish performance of PI HESS controllers where the settlement time takes over 1 sec. Due to the cooperative nature of current sharing between the battery and supercapacitor, this poor tracking performance on the battery current signal is also reflected on the transient current response with supercapacitor. The PI controller results in an excessive overshoot to about 4.5 A because of the requirement for fast dynamic response on the supercapacitor current. This value is highly deviated from the setpoint current generated from the local voltage regulation unit.

For the systems and methods for sliding mode control enabled hybrid energy storage, the super-capacitor current is properly followed with only a 4 percent overshoot, which is negligible with respect to the conventional algorithm. It is also shown that proper transient and steady state current trackings by the systems and methods for sliding mode control enabled hybrid energy storage have resulted in slightly enhanced bus voltage convergence by about 0.1 sec. The HESS current step-up to 12 A is obtained by disconnection of the solar node at about t=3 sec. For this case, the supercap current overshooting and battery current settlement time in conventional method is lowered, which is due to the lower step loading change on HESS unit. At about t=4 sec, the load step is reversed to its initial value while the solar unit is still disconnected. The superior tracking performance on the battery current for the systems and methods for sliding mode control enabled hybrid energy storage is evident where it converges within 0.1 sec, while it takes over 1.2 sec for the conventional algorithm to converge.

Scenario B: On-the-Fly Supercapacitor Charging Under Single Resistive Load Step

Figure 9:
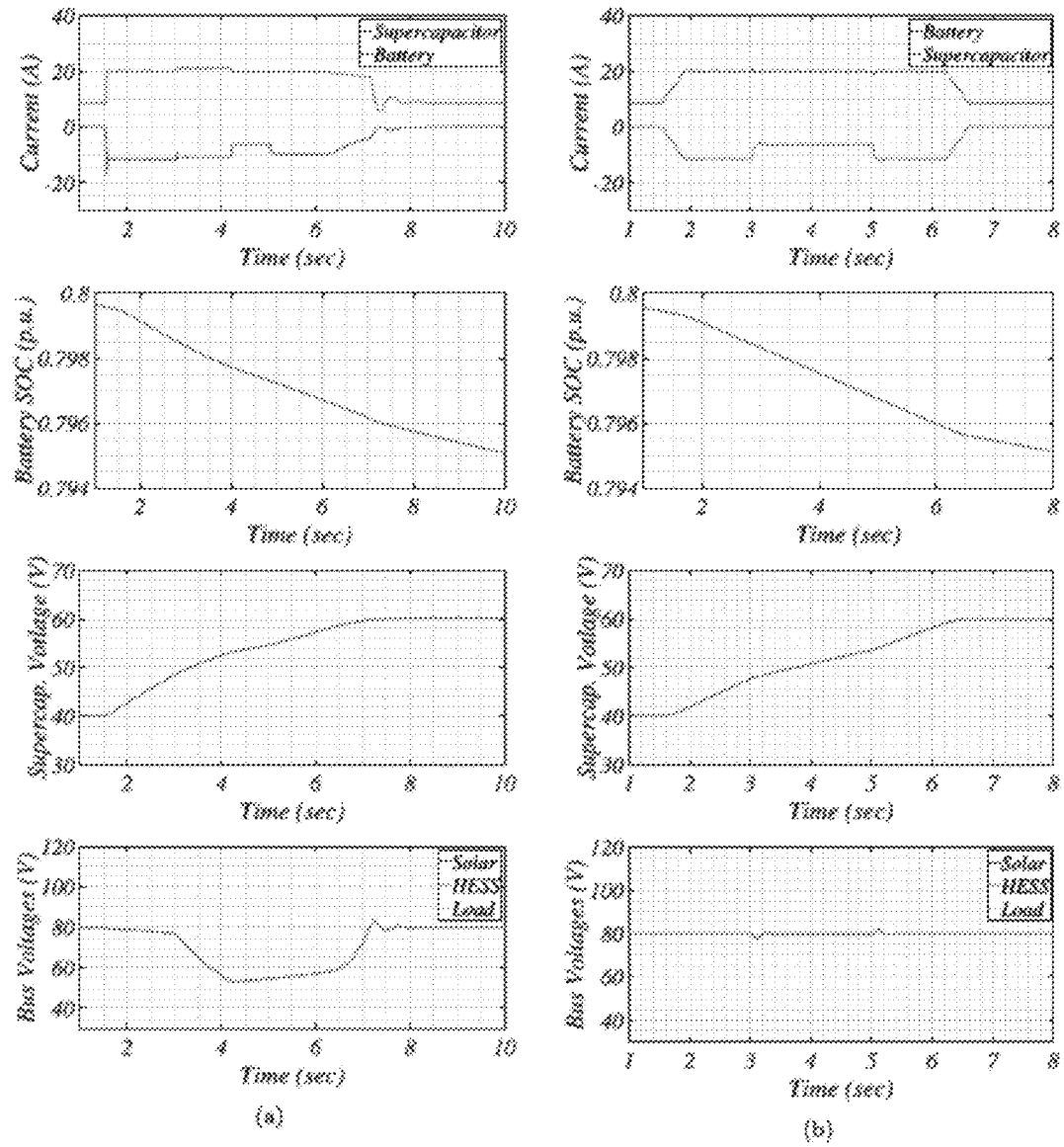
FIG. 9 are graphs depicting the on-the fly supercapacitor charging under the load step changes for (a) conventional control and (b) embodiments of systems and methods for sliding mode control enabled hybrid energy storage in accordance with the present invention.

In this scenario, the supercapacitor voltage is initially dropped to 40 V where the solar power generation is not sufficient to charge the HESS. Therefore, it is necessary to use battery for the on-the-fly charging of supercapacitor to ensure proper transient current support and to avoid supercap converter fault due to the low input voltage. FIG. 9 shows the performance of both algorithms. For the conventional scheme, the charging interruption feature is kept disabled to provide the quickest possible charging with the conventional algorithm.

For the systems and methods for sliding mode control enabled hybrid energy storage, the algorithm employed along with the SMC current regulation the on-the-fly charging process is enabled at about t=1.6 sec, as shown in FIG. 5. In the conventional scheme, the battery current control is saturated with its maximum value and the current is used to simultaneously power the load and charge the supercapacitor, resulting in the charging the supercap from the battery. The DC bus voltage regulation is corrupted when it falls to about 76.5 V.

At about t=3 sec, the same load step as in scenario A is applied to Rload2=8 52. This results in significant bus voltage drop to as low as 52 V, which typically result in the undervoltage protection activation. To demonstrate the destructive impact of this phenomenon, the under-voltage protection is disabled. This severe bus voltage regulation is due to the poorly shared current capacity for simultaneous regulation of DC bus voltage and the supercapacitor charging at its quickest possible rate. The supercap is fully charged to its nominal voltage value of 60 V within about 6 seconds. Once the charging process is completed, the supercap currents fall to zero and the battery current supplies the load, showing the deactivation of the on-the-fly charging process. As a result, the DC bus voltage proper regulation is resumed to the nominal voltage of 80 V with a 5% overshoot and settled after 0.85 seconds.

Using systems and methods for sliding mode control enabled hybrid energy storage, the battery discharge rate is properly followed once the charging algorithm is enabled. In this algorithm the maximum battery capacity is used to ensure the quickest possible on-the-fly charging process. Once the load step is applied at about t=3 sec, the supercapacitor charging current is reduced with the load profile to enable the load supply from the battery without violating the battery charge/discharge rates. From both current profiles in the systems and methods for sliding mode control enabled hybrid energy storage, the fast convergence within 0.2 sec to the setpoints are observed. As a result, the supercapacitor full-charge is also attained more quickly by about 1 second compared with the conventional approach. Furthermore, the error-free steady-state DC bus voltage regulation is maintained throughout the charging process, while only 3% overshoot/undershoot is found from similar load steps, which converged within 0.25 sec.

Figure 10:
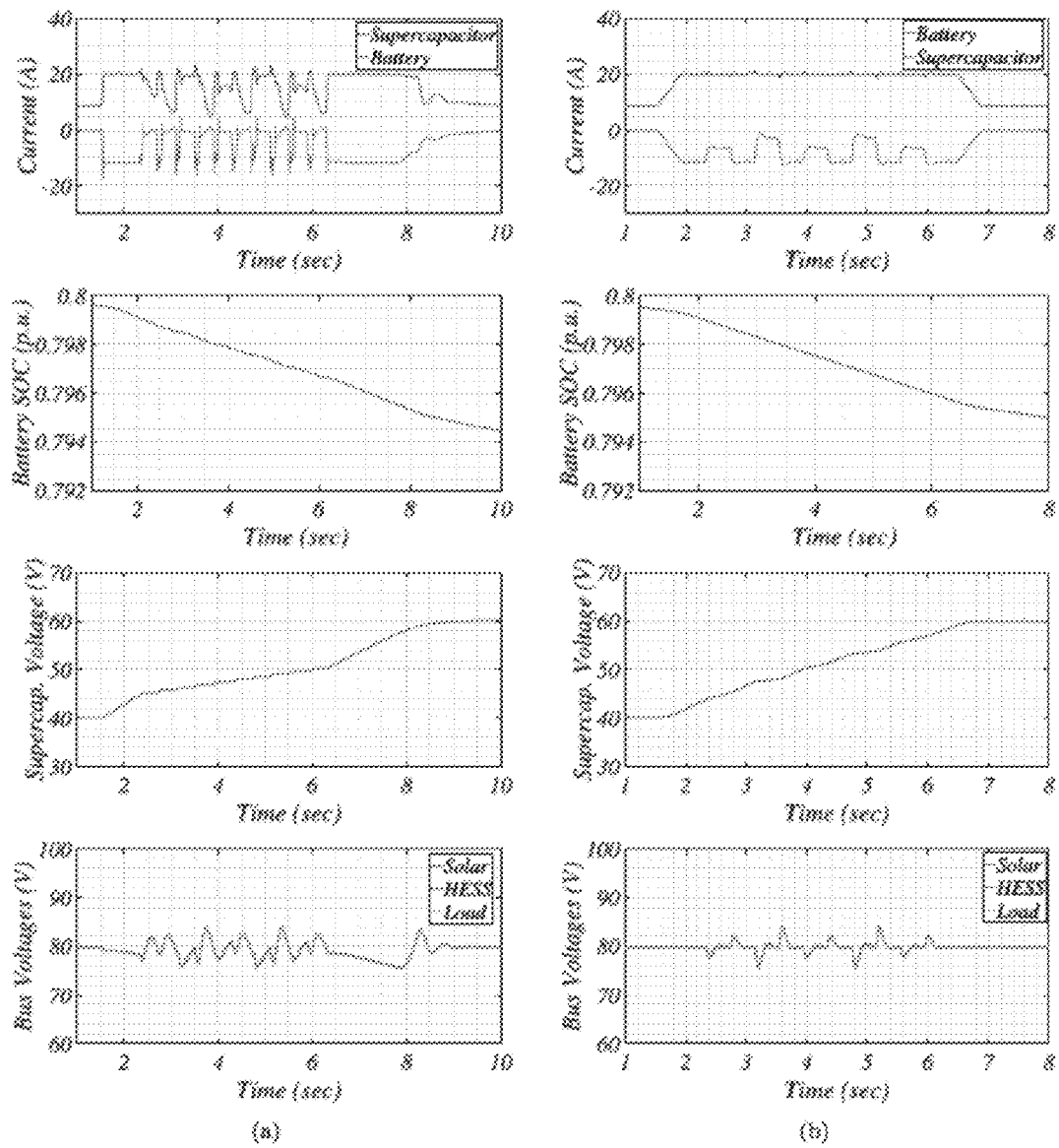
FIG. 10 are graphs depicting the on-the fly supercapacitor charging under the pulsing loads with both resistive and constant power load (CPL) step changes for (a) conventional control and (b) embodiments of systems and methods for sliding mode control enabled hybrid energy storage in accordance with the present invention.
Figure 11:
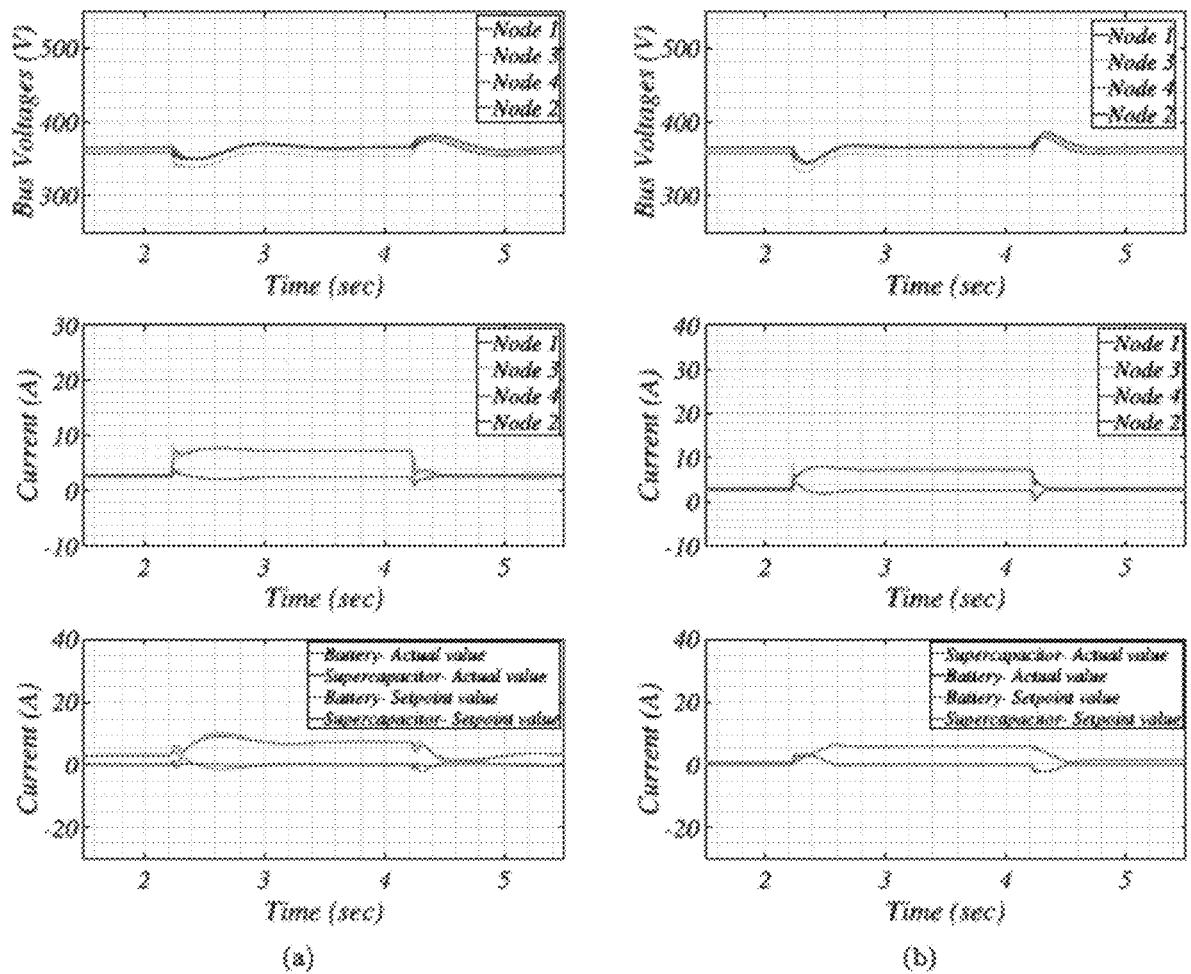
FIG. 11 are graphs of the current and voltage control for a HESS unit under CPL steps with secondary distributed current sharing between nodes 2,3 for (a) conventional control and (b) embodiments of systems and methods for sliding mode control enabled hybrid energy storage in accordance with the present invention.
Figure 12:
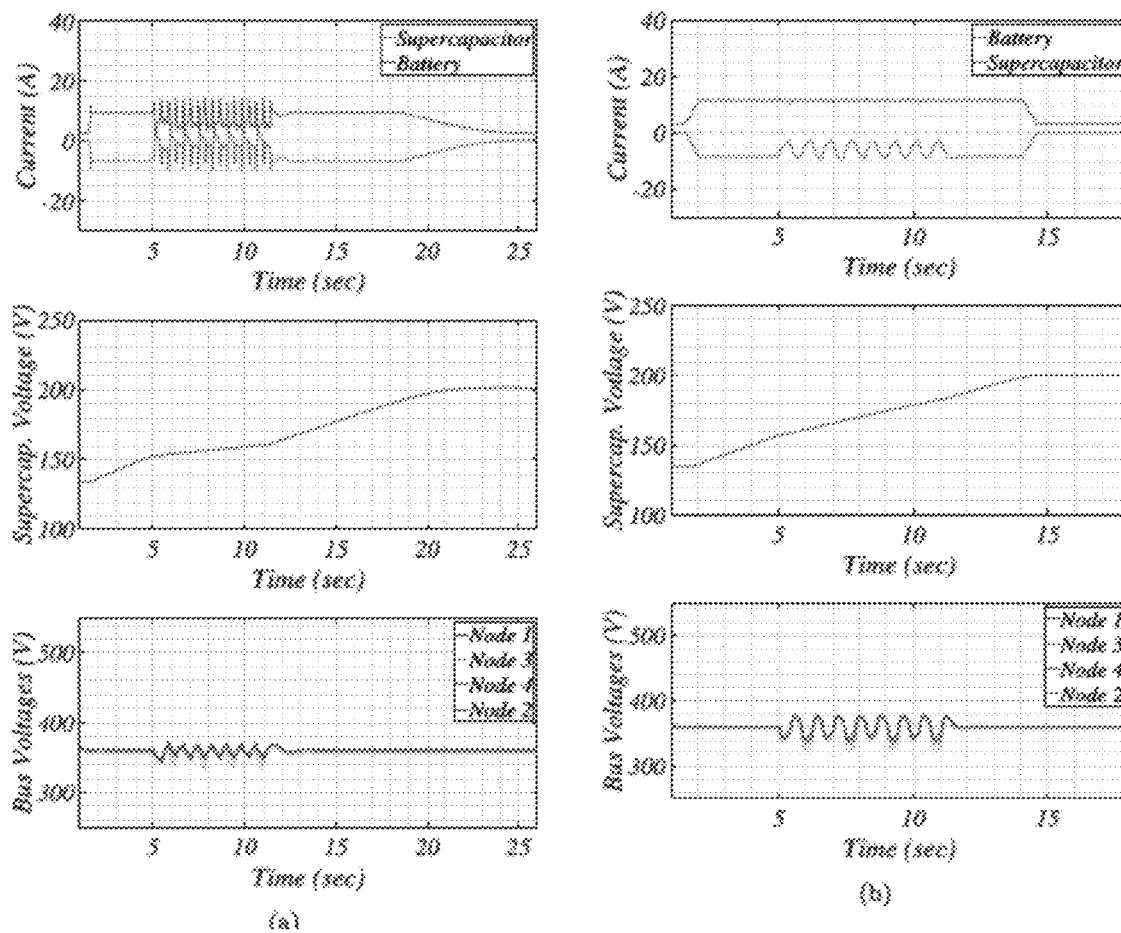
FIG. 12 are graphs depicting the on-the fly supercapacitor charging under the pulsing loads with both resistive and CPL step changes for (a) conventional control and (b) embodiments of systems and methods for sliding mode control enabled hybrid energy storage in accordance with the present invention.

Scenario C: On-the-Fly Supercapacitor Charging Under Pulsing CPL and Resistive Load In this scenario the same initial loading and initial supercapacitor voltage condition as scenario B is maintained. Compared with the previous scenario, a combination of CPL and resistive pulsing loads are consecutively applied during an on-the-fly supercapacitor charging period for a specified interval and the observed signals. Both schemes are shown in FIG. 10. For the conventional approach, the supercap charging interruption under loading transients is used (Augustine et al., 2019). At 1.5 sec, the on-the fly charging is enabled. For the systems and methods for sliding mode control enabled hybrid energy storage, a smooth battery discharge rate is observed by the error-free tracking of low frequency setpoint with SMC current controllers. In contrast, the conventional scheme resulted in an undesired rapid discharge current rise in battery and a saturation to the maximum value, which made the LPFs and PIs ineffective.

Using a combination of robust SMC current controllers and more effective utilization of the remaining battery discharge capacity to charge the supercapacitor on-the-fly, the charging process was not interrupted even under pulsing resistive and CPL loads. In fact, the applied pulsing load disturbances with the sequence of resistive-CPL-resistive-CPL-resistive have been properly rejected by SMC battery current controller within less than 0.02-0.03 sec. In this case, the load transients are surpassed with changing the level of supercap charging current demand. This enabled using the remaining battery discharge capacity to quickly charge the supercap on-the-fly, which charged the supercap within 5.5 sec in the case of the systems and methods for sliding mode control enabled hybrid energy storage. In contrast, the conventional scheme takes about 7.5 sec. Considering the charging interruption on load transients by the conventional scheme, the complete charging process can even take a much longer duration if pulsing loads were continuously applied. Also, such load disturbances resulted in poor current sharing between battery and supercap as the load current is reflected on both values. The impacts of such transients are shown to be more severe on the DC bus voltage of the conventional scheme, where it deviates from the nominal value with undershoots and overshoots up to 7%, while these voltage transients are settled within 0.2-0.4 second based on the nature of the load.

Scenario D: HESS Current Control with Distributed Secondary Current Sharing Between ESS Units Under CPL Step In this scenario, the HESS unit at node 2 of the 4-bus configuration is tested against a CPL step applied at node 3, as shown in FIG. 7. Here, the power generations on the solar nodes are limited to 0.15 p.u., due to their available irradiation level, and the BESS and HESS units cooperatively supply the demanded load current using distributed secondary control. In this case, the CPL is initially set with 1 kW and the remaining load current is attributed to the system constant loads. FIG. 5 shows the performance on both algorithms. At about t=2.2 sec, a CPL step-up to 4 kW is applied at node 3. Like Scenario A, the proposed SMC current controllers properly track the decoupled current setpoints on the battery and the supercap, where a rapid convergence within 0.2 sec on the battery is accompanied with only 2% overshoot on the supercap current. The performance of the conventional PI HESS current controllers deteriorates with such a load step with about 3 A initial overshoot on the ramp states of the battery current occurring. The lack of proper tracking on the battery current setpoint and its lagging persists in this scenario, resulting in the deviation at the supercap currents and only settling after about 0.9 sec.

The deterioration of the performance of the conventional HESS current controllers on CPL transient compared with resistive load step in scenario A is due to the presence of such a nonlinear load type, which at some stages generates a negative resistance effect. The local controller performance for the systems and methods for sliding mode control enabled hybrid energy storage is reflected on the secondary controller, where the distributed control convergence between nodes 2 and 3 is achieved within 0.03 sec. In contrast, it takes about 0.25 sec for the conventional scheme. The rapid convergence and proper current regulations for the systems and methods for sliding mode control enabled hybrid energy storage has also improved the settling time on the DC bus voltage, where it takes 0.45 sec for system compared to 0.62 sec for the conventional scheme. Similar performance with the load step-down at about t=4.2 sec is also observed. With modified voltage control gains, the slightly higher voltage undershoot/overshoot in the systems and methods for sliding mode control enabled hybrid energy storage can be mitigated or eliminated at the expense of similar settling time with the conventional scheme voltage regulation. The same voltage control gains were applied to both schemes for comparison.

Scenario E: On-the-Fly Supercapacitor Charging Under Distributed Pulsing CPL and Resistive Loads In this scenario, a similar sequence of pulsing power loads as in scenario C with a combination of CPL and resistive load steps were applied to the systems, as shown in FIG. 7. The load values are based on those presented in Table 3. The on-the-fly supercap charging algorithm on the HESS local control is tested against a distributed load condition. The charging from the neighboring BESS unit at node 3 was not considered, rather just the on-the-fly charging of the HESS supercapacitor from its own battery unit was considered. FIG. 6 shows the observed signals for this scenario. The supercapacitor initial voltage is set at 135 V, and the charging algorithm is enabled at about 1.5 sec. The systems and methods for sliding mode control enabled hybrid energy storage to provide a faster charging to about 158 V compared to 152 V for the conventional scheme during the 3.5 sec after its charging activation. By applying a sequence of pulsing loads starting at about 5 sec, the superior performance of the systems and methods for sliding mode control enabled hybrid energy storage is verified, ensuring the full charge within 13 sec while it takes about 20 sec for the conventional scheme.

For the systems and methods for sliding mode control enabled hybrid energy storage, it was observed that the battery current remained steady with rapid disturbance rejection capability attained by sliding mode control through the load transients. For the conventional scheme, such load pulsings, highly impacted both the supercap and the battery currents, which can also adversely impact the battery durability. A slight increase of 2% in the DC bus voltage undershoot and overshoot under load transients was observed on the systems and methods for sliding mode control enabled hybrid energy storage, which can be improved by harmonizing other local controllers with the same sliding mode controller and using a modified DC bus voltage controller regulation. The voltage control parameters were not changed for the comparison.

The systems and methods for sliding mode control enabled hybrid energy storage can provide uninterruptible supercapacitor cyclic charging, including while having its HESS in the discharge mode. Using the rate limiter for the HESS current components decoupling along with the sliding mode control enables a more systematic design and tuning approach, while conventional schemes that use low-order LPFs results in sluggish and nonlinear behaviors. For the systems and methods for sliding mode control enabled hybrid energy storage, the low-frequency battery setpoint is tracked with less than 0.2% throughout the profile and the transient current reference is effectively followed with less than 1% deviation in most of the profile tracking stage. The proper tracking of the current setpoints results in an improved DC bus voltage regulation. Unlike the conventional schemes, which interrupt the supercapacitor charging process by any minor super-capacitor current detection, the systems and methods for sliding mode control enabled hybrid energy storage allows for uninterruptible charging with maximum available dynamics without deteriorating the DC bus voltage regulation. The employed predictive charging mode also enabled an overshoot-free regulation of the supercapacitor voltage. The performance of the systems and methods for sliding mode control enabled hybrid energy storage was verified in two different islanded DC microgrid configurations in the presence of pulsing loads with both CPL and resistive loads.

To understand the systems and methods for sliding mode control enabled hybrid energy storage, references are made in the text to exemplary embodiments of systems and methods of the sliding mode control enabled hybrid energy storage, only some of which are described herein. No limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Although the invention has been described with reference to the above examples, it will be understood that modifications and variations are encompassed within the spirit and scope of the invention. Accordingly, the invention is limited only by the following claims.

What is claimed is:

1. A method for controlling an islanded direct current microgrid comprising:
   connecting one or more loads to a voltage bus of the microgrid;
   connecting a PV unit to the voltage bus, wherein the PV unit comprises a plurality of PV cells, a solar converter, a DC voltage bus, at least one battery pack, a hybrid energy storage system (HESS) unit, a supercapacitor module, and two or more loads;
   integrating a hybrid energy storage system (HESS unit) into the microgrid, wherein such HESS unit comprises:
   a current rate limiter;
   connection to a battery;
   connection to a supercapacitor module; and
   connection to the voltage bus;
   regulating a current of the battery;
   regulating a current of the supercapacitor module, wherein a supercapacitor current provides excess power demand based on different loading conditions to an islanded direct current microgrid;
   controlling the supercapacitor module, wherein the supercapacitor module is connected in parallel formation to a direct current bus voltage control loop;
   detecting a voltage drop of the supercapacitor module to a value lower than a minimum threshold voltage for said supercapacitor module;
   providing a current setpoint for the supercapacitor module, wherein said current setpoint is determined by offsetting a maximum setpoint current value from both an actual current value of the supercapacitor module and a setpoint current value of the battery; and
   saturating a capacity of a reference hybrid energy storage system current, wherein the battery current reference always remains saturated during a charging process, and wherein the supercapacitor is charged with excess power generated by the battery as compared with a demanded load power.

2. The method of claim 1 further comprising prioritizing a direct bus voltage regulation, wherein the prioritizing the direct bus voltage comprises a current setpoint is saturated by voltage regulation over its charging with an adaptive current limiting unit to ensure on-the-fly charging under different loading conditions.

3. The method of claim 1 further comprising reducing an average power of an electrical system with pulse-width modulation.

4. The method of claim 1, wherein said loading conditions comprise pulsing power loads.

\* \* \* \* \*